April 10, 1956 — I. G. THOMPSON III — 2,741,503
MOTORIZED LOCKING MEANS
Filed Nov. 20, 1953 — 2 Sheets-Sheet 1

*INVENTOR.*
*IVERSON G. THOMPSON, III.*
BY
*McMorrow, Berman & Davidson*
*ATTORNEYS.*

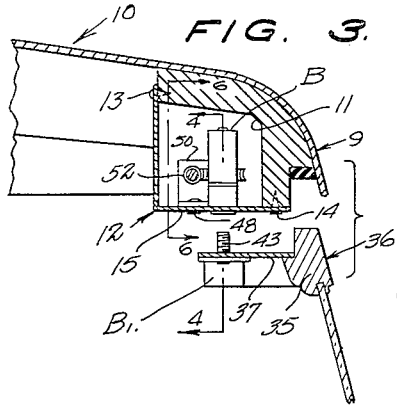

United States Patent Office 2,741,503
Patented Apr. 10, 1956

2,741,503

MOTORIZED LOCKING MEANS

Iverson G. Thompson III, Houston, Tex.

Application November 20, 1953, Serial No. 393,302

4 Claims. (Cl. 292—251)

This invention relates to electro-mechanical locking means especially, but not exclusively for automobile and other convertible tops, and the primary object of the invention is to provide novel, practical, and efficient locking means of this kind which, when energized, provides for automatic and secure locking of the forward header of a convertible top to the windshield frame or the like as the convertible top is operated into position, preferably by the electrical or hydraulic means presently used to operate convertible tops; and provides for unlocking of the convertible top as the convertible top is retracted toward folded position.

Another important object of the invention is to provide reliable and easy operating locking means of the character indicated above, which can be easily and readily installed with a minimum of mutilation and alteration of a convertible top and of a windshield frame, which can be substantially concealed, and which can be made in a rugged and serviceable form at relatively low cost.

Other important objects and advantageous features of the invention will be apparent from the following description and the accompanying drawings, wherein, for purposes of illustration rather than limitation, a specific embodiment of the invention is set forth in detail.

Figure 3 is a transverse vertical section taken on the line 3—3 of Figure 2;

Figure 4 is an enlarged fragmentary transverse vertical section taken on the line 4—4 of Figure 3;

Figure 5 is a horizontal section taken on the line 5—5 of Figure 4;

Figure 6 is a fragmentary side elevation of one of the locking elements, and

Figure 7 is a wiring diagram showing control circuits for the locking elements.

Figure 1:
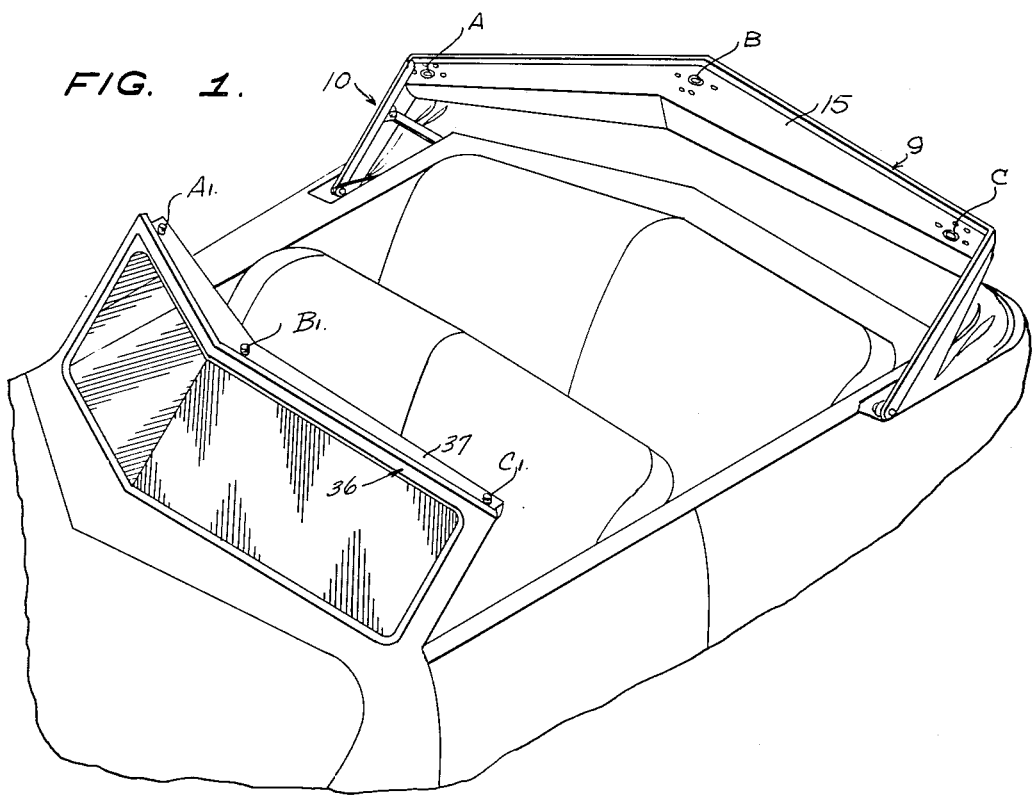
Figure 1 is a fragmentary perspective view of a convertible automobile having a convertible top and a windshield frame equipped in accordance with the present invention.
Figure 2:
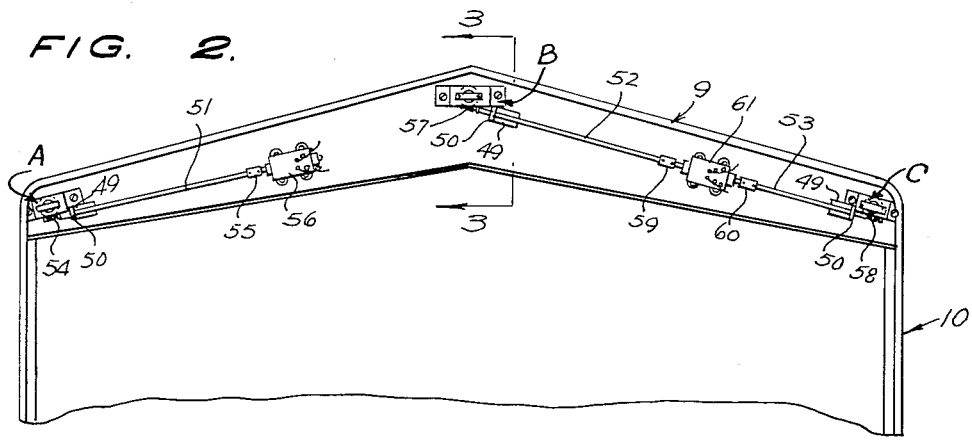
Figure 2 is a fragmentary plan view of the underside of a convertible top, the underpart of its header being removed to disclose locking mechanism.

Referring in detail to the drawings, wherein like numerals designate like parts throughout the several views, the illustrated locking means involves three similar locking elements A, B and C enclosed within the header 9 of a convertible top 10, the header 9 being hollow, as shown in Figure 3, so as to define a locking element chamber 11 which is closed at its lower end and rear side by a removable plate 12, held in place by screws 13 and 14, the various locking elements being mounted on the horizontal portion 15 of the plate 12. As shown in Figure 2 the element B is located at the middle of the header 9 and the elements A and C are located at opposite ends of the header 9.

Each of the locking elements A, B and C, comprises a rectangular block or plate 16 secured, as by bolts 17, to the inner or upper side of the plate portion 15. The block 16 is provided with a central journal hole 18 which is registered with a hole 19 provided in the plate portion 15.

In the holes 18 and 19 turns one end 21 of a sleeve 20 which has an internal bevel 21' at the end 21 and is internally threaded, as indicated at 22' as far as its other end 22. Midway between the ends 21 and 22 is an annulus 23 of worm gear teeth, one side of which bears against the inner or upper side 24 of the block 16.

The sleeve 20 is held in place by a U-shaped yoke 25 which includes a bight portion 26, opposed and spaced legs 27, 27, outwardly directed ears 28, 28 on the free ends of the legs 27, 27, and a web 29 extending between the legs 27, 27.

The web 29 bears against the side of the worm gear annulus 23 opposite the block 16 and has a journal hole 30 in which the sleeve 20 turns.

The yoke 25 is secured in place by the bolts 17, 17 which traverse the ears 28, 28, the block 16, and the portion 15 of the cover plate 12.

A limit switch 32, 32', or 32" is secured to the yoke bight portion 26 by suitable means, indicated at 33, and has a plunger 34 extending toward the end 22 of the sleeve 20.

Mounted on the upper member 35 of the windshield frame 36 and opposed to the locking elements A, B and C, are detent elements A1, B1, and C1, respectively, the said upper member 35 including a rearwardly projecting horizontal plate or bar 37 on which the detent elements are mounted.

Each of the detent elements A1, B1 and C1, which are similar in construction, comprises a cup-shaped rectangular housing 38 having a peripheral lateral flange 39 on its open upper end which is secured to the underside of the bar 37 by suitable means, such as the rivets 40.

On the web or bottom 41 of the housing 38 rests a rectangular plate or flange which is fixed on the lower end of an externally threaded stud or shank 43. The plate 42 fits the interior of the housing 38 so as to preclude rotation of the stud 43.

The stud 43 rises above the bar 37 through an opening 44 provided therein. A washer 45 which is circumposed on the stud 43 bears against the underside of the bar 37, and a helical spring 46, circumposed on the stud 43, is compressed between the washer 45 and the plate or flange 42, whereby the stud 43 is yieldably urged in an inward or downward direction, the stud 43 being otherwise free to move inwardly and outwardly with respect to the bar 37 and the housing 38.

Secured by suitable means, such as rivets 48, to the inner side of the convertible top header plate portion 15, alongside of each of the locking elements A, B and C, is an angle bracket 49 having a standard 50 through which is journalled a wormshaft 51 for the element A, and wormshafts 52 and 53 for the elements B and C, respectively.

The shaft 51 has a worm 54 engaged with the worm gear annulus of the element A and has its other end coupled, as indicated at 55 to the shaft of a small electric motor 56 which is secured by suitable means to the cover plate portion 15 inwardly of the element A.

The shaft 52 has a worm 57 meshed with the gear annulus of the element B and the shaft 53 has a worm 58 meshed with the gear annulus of the element C. The other ends of the shafts 52 and 53 are coupled, as indicated at 59 and 60, respectively, to the opposite ends of the shaft of a second small electric motor 61 which is suitably secured to the cover plate portion 15 at a point between the elements B and C.

As indicated in Figure 7, the motors 56 and 61 are arranged to be operated together so that the sleeves 20 rotate as the header 9 of the convertible top 10 is moved, by suitable operating means (not shown), toward the windshield frame member 36, so that as the lower ends 21 of the sleeves 20 engage over the studs 43, the sleeves 20 thread downwardly onto the studs 43 until the upper ends 43' of the studs 43, the studs 43 being longer than the sleeves 20, engage the plungers 34 of the limit switches 32 and deenergize the motors 56 and 61. Should there be any unevenness of engagement of sleeves 20 with studs 43, the springs 46 take up the slack and procure secure locking of the opposed locking and detent elements A, A1, B, B1, and C, C1. Reversal of the motors 56 and 61 disconnects the locking elements and the detent elements.

As shown in Figure 7, a five-pole double throw switch 63 is provided for deenergizing the motors 56 and 61 and for determining their directions of operation. The switch 63 has five contactors or switch arms 64, 65, 66, 67 and 68 which are opposed to contacts 69, 70, 71, 72 and 73 and 69', 70', 71', 72' and 73', respectively.

The motors 56 and 61 have respective field coils 74 and 75, armature coils 76 and 77, and pairs of brushes 78 and 79 and 80 and 81, connected to opposite ends of the armature coils.

The switch arms 64 and 68 are connected by a wire 82. The switch arms 65 and 66 are connected to power source wires 83 and 84, respectively, which are connected to such as the battery (not shown) of the automobile. The switch arm 67 is connected by a wire 85 with the power source wire 83.

A wire 86 is connected to both of the switch contacts 73 and 73' and to a wire 87 which is connected to both motor field coils 74 and 75 at one end thereof. The remaining ends of these field coils are connected by a wire 88 to both of the switch contacts 72 and 72'.

A wire 89 leads from the motor brush 78 to the switch contact 69. A wire 90 is also connected to the brush 78 and leads to the switch contact 70'. In the wire 90 are the limit switches 32' and 32''. A wire 91 leads from the wire 90 to the motor brush 80 and has therein the limit switch 32. A wire 92 is connected to the wire 91 at a point between the motor brush 80 and the limit switch 32 and leads to the switch contact 71.

A wire 93 leads from the motor brush 81 to the switch contact 71', and another wire 94 leads from the motor brush 79 to the wire 93. A wire 95 connects the switch contact 70 with the wire 93.

In the positions of the switch arms shown in Figure 7, the motors 56 and 61 rotate in one direction. By moving the switch arms into engagement with the opposed switch contacts, the motors 56 and 61 rotate in the opposite direction. The limit switches 32, 32' and 32'' are normally closed and are opened to deenergize the motors 56 and 61 only when the locking action takes place.

What is claimed is:
1. In a locking mechanism, a first support, a base on said support, an internally threaded sleeve journalled on the base, a second support, an externally threaded stud non-rotatably secured on said second support, said sleeve having an open end arranged to receive an end of said stud, and rotating means on said first support for rotating said sleeve so as to thread said sleeve onto said stud and secure the supports together, and means for reversing said rotating means to thread the sleeve off the stud and disconnect the supports, said rotating means comprising electric motor means operatively connected to said sleeve, and limit switch means operable by said stud and connected to said motor means for deenergizing the motor means as the sleeve is threaded home onto said stud.

2. In a locking mechanism, a first support, a base on said support, an internally threaded sleeve journalled on the base, a second support, an externally threaded stud non-rotatably secured on said second support, said sleeve having an open end arranged to receive an end of said stud, and rotating means on said first support for rotating said sleeve so as to thread said sleeve onto said stud and secure the supports together, means mounting said stud on said second support for endwise movement relative to said second support, and spring means acting between said stud and said second support and yieldably retracting said stud in a direction to urge the supports together with the sleeve threaded on the stud.

3. In a locking mechanism, a first support, a base on said first support, an internally threaded sleeve journalled through said support, a worm gear fixed to and surrounding said sleeve, a worm rotatably mounted on said first support and meshed with said worm gear, means on said base precluding endwise movement of said sleeve relative to the base, a second support, an externally threaded stud non-rotatably secured to said second support, said sleeve having an open end in line with said stud and arranged to threadedly receive said stud, and rotating means connected to said worm for rotating said sleeve in one direction to thread the sleeve onto the stud and in the opposite direction to thread the sleeve off the stud.

4. In a locking mechanism, a first support, a base on said first support, an internally threaded sleeve journaled through said support, a worm gear fixed to and surrounding said sleeve, a worm rotatably mounted on said first support and meshed with said worm gear, means on said base precluding endwise movement of said sleeve relative to the base, a second support, an externally threaded stud non-rotatably secured to said second support, said sleeve having an open end in line with said stud and arranged to threadedly receive said stud, and rotating means connected to said worm for rotating said sleeve in one direction to thread the sleeve onto the stud and in the opposite direction to thread the sleeve off the stud, said sleeve having another open end, a yoke secured to said base and extending across and spaced from said other open end of the sleeve, a limit switch mounted on said yoke at the said other open end of the sleeve, a switch actuating plunger on said switch arranged to be operatively engaged by said stud as said stud is threaded through the sleeve, said rotating means comprising a motor having a control connection with said switch.

References Cited in the file of this patent
UNITED STATES PATENTS

| | | |
|---|---|---|
| 1,300,298 | Robinson | Apr. 15, 1919 |
| 1,856,091 | Dina | May 3, 1932 |
| 2,394,749 | Chester | Feb. 12, 1946 |

FOREIGN PATENTS

| | | |
|---|---|---|
| 380,044 | Italy | Apr. 18, 1940 |
| 870,013 | France | Nov. 27, 1941 |